(12) United States Patent
Paul et al.

(10) Patent No.: US 8,126,959 B2
(45) Date of Patent: Feb. 28, 2012

(54) METHOD AND SYSTEM FOR DYNAMIC REDISTRIBUTION OF REMOTE COMPUTER BOOT SERVICE IN A NETWORK CONTAINING MULTIPLE BOOT SERVERS

(75) Inventors: Chakkalamattam J. Paul, Austin, TX (US); Bradford A. Stern, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3163 days.

(21) Appl. No.: 09/894,399

(22) Filed: Jun. 28, 2001

(65) Prior Publication Data

US 2003/0005096 A1 Jan. 2, 2003

(51) Int. Cl.
G06F 15/16 (2006.01)
G06F 15/177 (2006.01)
G06F 15/173 (2006.01)

(52) U.S. Cl. ........ 709/203; 709/217; 709/220; 709/222; 709/226

(58) Field of Classification Search .................. 709/203, 709/217, 219, 227, 228, 220, 222, 226
See application file for complete search history.

(56) References Cited

U.S. PATENT DOCUMENTS

| 5,870,554 | A | * | 2/1999 | Grossman et al. | 713/2 |
| 6,330,617 | B1 | * | 12/2001 | Bamforth et al. | 709/246 |
| 6,345,294 | B1 | * | 2/2002 | O'Toole et al. | 709/222 |
| 6,463,530 | B1 | * | 10/2002 | Sposato | 713/2 |
| 6,606,643 | B1 | * | 8/2003 | Emens et al. | 709/203 |
| 7,068,597 | B1 | * | 6/2006 | Fijolek et al. | 370/230 |

OTHER PUBLICATIONS

"Preboot Execution Environment (PXE) Specification Version 2.1", Intel Corp., pp. 1-38, Sep. 20, 1999.

* cited by examiner

*Primary Examiner* — Karen Tang
(74) *Attorney, Agent, or Firm* — Yee & Associates, P.C.; Jeffrey S. LaBaw (57) ABSTRACT

A method and a system are presented for facilitating a PXE-compliant (Preboot Execution Environment) remote boot process between clients and multiple servers. All clients are initially directed to the address of the central boot server when they initially request remote boot service. The central boot server returns the same small initial bootstrap program to every client, which is then executed by the client's embedded boot program. The received initial bootstrap program contains only enough logic to have the client request and receive a list of alternate boot server addresses. The list may be ordered to present to the client a series of best-available boot servers, or the client may search the list to determine an address of an alternate boot server that can efficiently continue the remote boot process. The client selects a boot server from the list and requests the next program from the selected boot server.

20 Claims, 7 Drawing Sheets

METHOD AND SYSTEM FOR DYNAMIC REDISTRIBUTION OF REMOTE COMPUTER BOOT SERVICE IN A NETWORK CONTAINING MULTIPLE BOOT SERVERS

BACKGROUND OF THE INVENTION

1. Field of the Invention

The present invention relates to an improved data processing system and method for coordinating the operation of multiple computing devices, and in particular, to a method and system for initializing computers and other computing devices through a computer communications network.

2. Description of Related Art

A modern distributed computing environment in a moderate to large enterprise consists of many computing devices that communicate with each other through a computer communications network. There are two groups of devices, called clients and servers, which perform the computational tasks associated with the defined purposes, or missions, of the enterprise. Clients request centralized data processing services from servers when performing computational tasks. Servers supply those requested services. Generally, there are more clients than servers because servers are typically larger machines that can each service the requests of many clients.

Clients are usually operated by people who are end-users of the enterprise computing environment. Each end-user has a role in the enterprise which requires access to a subset of the computational tasks associated with the missions of the enterprise. End-users with different roles require access to different subsets of computational tasks. It is important that each end-user have rapid and easy access to the appropriate subset of computational tasks associated with that end-user's role. It is also important that each end-user not have access to computational tasks that are not associated with that end-user's role. By limiting end-user access in this way, end-users are prevented from causing inadvertent or deliberate damage to the enterprise computing environment.

Servers are operated by people who are administrators of the enterprise computing environment. Administrators have roles that assure that the enterprise computing environment is available to end-users with a minimum specified quality of service. The computational tasks associated with administrator roles are therefore associated with the availability of the enterprise computing environment and not necessarily directly associated with the missions of the enterprise. In addition to operating servers, administrators are responsible for the installation, configuration and maintenance of the entire enterprise computing environment, including servers, networks, and clients. An important responsibility of administrators is to define the software configuration of each client so that it matches the access requirements of the end-user who is operating the client.

The integration of clients and servers into distributed computing environments has provided benefits to enterprises by making data more available when and where it is needed. The productivity of end-users has been increased by significantly reducing manual handling and processing of data that is required to make the data useful to the enterprise. Moreover, client-server environments have made it possible to use this data as a tool to improve strategic decision making, and it has permitted enterprises to take advantage of the decreasing unit cost of computing by distributing data processing to newer devices.

The increasing complexity of distributed computing environments has also increased the costs of administering these environments. These increasing administrative costs offset the benefits described above. In fact, as the unit cost of computing devices has decreased, these administrative costs are responsible for an increasing proportion of the total cost of ownership of data processing resources. This has made these administrative costs a target for increasing cost-containment efforts by enterprises. End-user client devices contribute a significant and increasing share of these administrative costs because they are the most numerous, most functionally diverse, most physically scattered, and most vulnerable of the computing resources.

The concept of the server-managed client has been introduced as a means of controlling the administrative costs of these clients. The implementation of this concept permits administrators to define the client software environment using resources available on centrally located servers rather than having to physically visit and configure each client separately. These server resources include files that are stored on servers and that are copied through the network by clients. These transferred files include program files that contain the client software instructions that execute on the client and data files which define the enterprise computing environment for that client software. These server resources also include administrative software running on servers to automate the creation and management of client software environment definitions.

The implementation of server-managed clients is made possible with a remote boot process that is provided to the client. A boot process on a client is defined as a sequence of program instructions that begins automatically when the client is started or reset and completes when an end-user software environment is operational on the client. The initial instructions that are executed in a boot process are fixed in the nonvolatile memory of the hardware of the client. As the boot process progresses, program instructions are located on a source outside of the client's nonvolatile memory and copied into the client's volatile memory (also referred to as dynamic or random access memory). Client execution is then transferred from nonvolatile memory to these instructions in volatile memory. Those instructions in volatile memory continue the boot process by locating and copying additional program instructions and data into the client until the end-user software environment is operational.

In a remote boot process (also called a network boot process) some or all of the program instructions and data are copied to the client's volatile memory by requesting and receiving files from a specified server, called a boot server, over a network through the client's network interface device. This is distinguished from a local boot process where the source of the program instructions and data is nonvolatile medium residing in a device that is attached to the client, such as a diskette, hard disk, or CD-ROM. A remote boot process allows end-user software environments to be located in a repository on a centrally-located boot server instead of having to be transported on a separate physical media to the location of every client.

The server-managed client concept has administrative benefits that go well beyond those associated with the initial deployment of a client. Updates, fixes, or changes to client operating systems and application programs can be applied to the client files where they are stored on the servers. Those changes can then be deployed to all clients automatically using the remote boot process with no administrator or end-user intervention required except to initiate the remote boot by restarting or resetting each client. By assuring the consistency of the client machine software environments in this manner, the incidence and impact of software-related problems is reduced, thereby reducing the cost and complexity of diagnosing and rectifying client-side problems.

Multiple client operating systems can be supported to meet application needs, end-user preferences, or hardware compatibility issues. Access to a client machine's local hard drive can be restricted to force all end-user generated data to be stored on a server, ensuring that such critical enterprise data is always available. End-user authentication and authorization processes can be centralized and simplified.

Separate classes of client desktop interfaces can be deployed for each class of end-user, or an administrator can have the ability to define customized desktop environments, including a set of specific authorized applications for each end-user in a domain. More dynamically, end-users can have "roaming" desktops. When an end-user logs on to a client machine, the end-user's desktop and applications are supplied from the server, giving the end-user the ability to log on to any client machine in the domain and see the same desktop and applications. This capability is particularly useful in environments in which end-users do not always work at an assigned workstation but move between workstations based on availability, such as call centers, banks, or airline departure gates.

The server-managed client architecture also increases the reliance of clients upon the boot server for their ability to operate. By extension, the mission-critical computational tasks of the enterprise are also more reliant upon having the boot server maintain a minimum quality of service. For instance, during failure recovery after a power failure or some other type of widespread system outage, a large number of clients will need to be remote booted almost simultaneously. In some environments, the distributed computing environment needs to assure that the clients can complete the remote boot process within a specified time constraint, thereby imposing both availability and performance constraints on the remote boot infrastructure. A fault-tolerant, performance-sensitive solution would ensure that the clients can complete the remote boot process with a minimum required quality of service over a wide range of operating conditions within the remote boot infrastructure.

A remote boot service which requires the network transfer of an operating system to the target client computer can generate a considerable amount of demand on a source server computer providing the boot service, particularly if there are many client computers requesting the remote boot service concurrently. One manner of resolving the demand problem is to place multiple alternate server computers within the network, any of which can provide the remote boot service to any of the target client computers. However, with this solution, there is no guarantee that the demand will be appropriately load-balanced among the boot servers.

Therefore, it would be advantageous to provide a method and system for a performance-sensitive remote boot solution that can dynamically respond to changes in the quality of service provided by each of multiple redundant boot servers. It would be particularly advantageous for the method and system to dynamically direct clients to boot servers that have relatively low demands in order to provide the best possible service to the requesting clients.

SUMMARY OF THE INVENTION

A method, a system, an apparatus, and a computer program product are presented for facilitating a remote boot process. All clients are initially directed to the address of the central boot server when they initially request remote boot service. The central boot server returns the same small initial bootstrap program to every client computer, which is then executed by the client's embedded boot program. The received initial bootstrap program contains only enough logic to have the client computer request and receive a list of alternate boot server addresses. The list may already be ordered to present a series of best-available boot servers to the client, or the client may search the list to determine an address of an alternate boot server that can efficiently continue the remote boot of the client. The initial bootstrap logic concludes by requesting the next program from the selected boot server, receiving the requested program, and transferring client computer execution to that program to continue the remote boot of the client.

While the set of alternate boot servers are providing boot service, each boot server in the set of alternate boot servers runs a daemon to determine the load of the server. The daemon reports its server's load status back to the central boot server.

The central boot server runs a boot service configuration daemon to maintain the list of alternate boot servers. The order of the alternate boot server addresses on the list is continuously updated by the boot service configuration daemon running on the central boot server. This daemon may have access to data provided by other services which can indicate the current status of the network and the current status of the availability and loading of all of the alternate boot servers. The alternate boot server address list is reordered by this daemon as the monitored statuses change. In a preferred embodiment, the daemon orders the list so that the address of the alternate boot server that can most efficiently service the next received client computer boot request appears first on the list, with the other alternate boot server addresses following in order of decreasing efficiency with which they can service the request.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

Figure 1A:
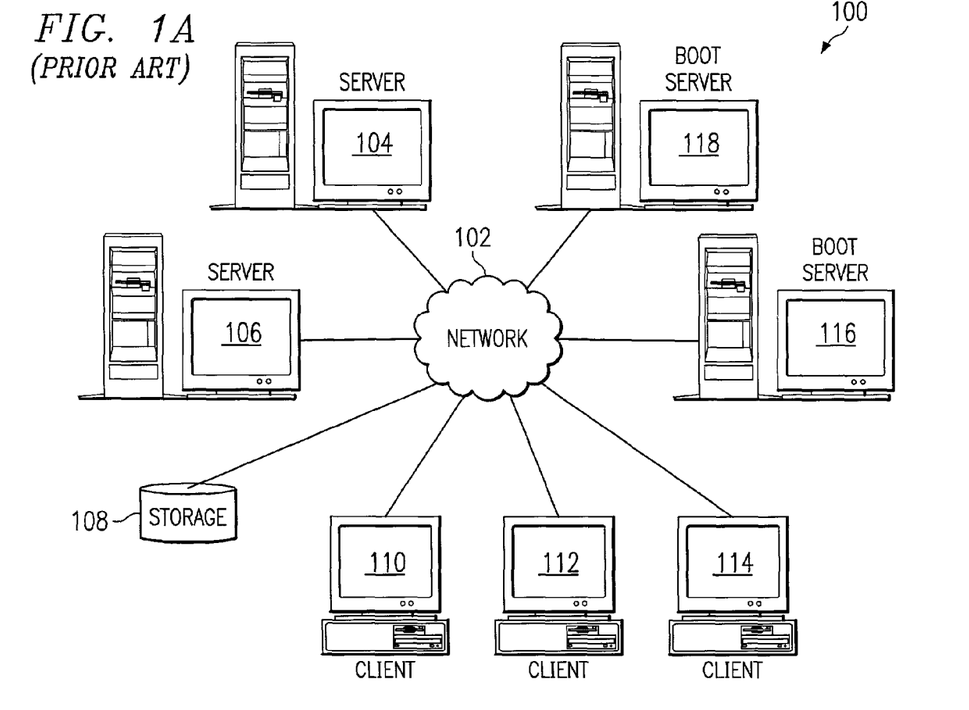
FIG. 1A depicts a typical distributed data processing system in which the present invention may be implemented.

With reference now to the figures, FIG. 1A depicts a typical network of data processing systems. Distributed data processing system 100 contains network 102, which is a medium that may be used to provide communications links between various devices and computers connected together within distributed data processing system 100. Network 102 may include permanent connections, such as wire or fiber optic cables, or temporary connections made through telephone or wireless communications. In the depicted example, application server 104 and application server 106 are connected to network 102 along with storage unit 108. In addition, clients 110-114 also are connected to network 102. Clients 110-114 can employ boot servers 116 and 118 to receive operating system files and/or application files.

The present invention could be implemented on a variety of hardware platforms; FIG. 1A is intended as an example of a heterogeneous computing environment and not as an architectural limitation for the present invention. Data processing systems connected to the network may be represented by a variety of computing devices, such as mainframes, personal computers, personal digital assistants (PDAs), etc. Distributed data processing system 100 may include additional servers, clients, routers, and other devices that are not shown.

Figure 1B:
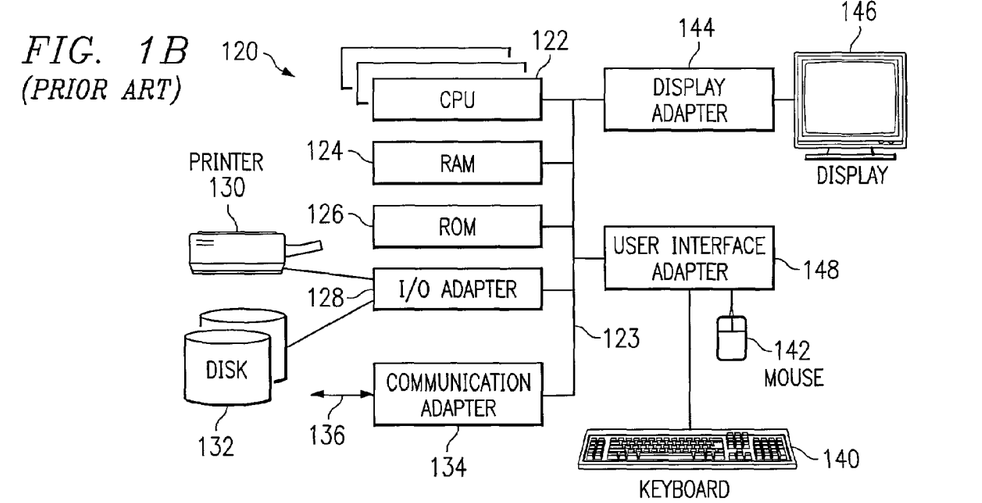
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A. Data processing system 120 contains one or more central processing units (CPUs) 122 connected to internal system bus 123, which interconnects random access memory (RAM) 124, read-only memory (ROM) 126, and input/output adapter 128, which supports various I/O devices, such as printer 130, disk units 132, or other devices not shown, such as a sound system, etc. System bus 123 also connects communication adapter 134 that provides access to communication link 136. Communication adapter 134 may include a network interface card (NIC), and system 120 may be PXE-enabled by including the appropriate functionality within an optional ROM on the NIC or within some other system ROM. User interface adapter 148 connects various user devices, such as keyboard 140 and mouse 142, or other devices not shown, such as a stylus, microphone, etc. Display adapter 144 connects system bus 123 to display device 146.

Those of ordinary skill in the art will appreciate that the hardware in FIG. 1B may vary depending on the system implementation. For example, the system may have one or more processors and multiple types of nonvolatile memory. Other peripheral devices may be used in addition to or in place of the hardware depicted in FIG. 1B. In other words, one of ordinary skill in the art would not expect to find similar components or architectures within a network-enabled phone and a desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a Microsoft® Windows® operating system environment.

The present invention may be implemented on a variety of hardware and software platforms, as described above. More specifically, though, the present invention is directed to providing a performance-sensitive, load-balanced, remote boot methodology. As background, a typical remote boot methodology is described before describing the present invention in more detail.

With reference now to FIGS. 2A-2D, a set of figures describes the standard PXE remote boot methodology. The description of FIGS. 2A-2D is adapted from *Preboot Execution Environment (PXE) Specification, Version* 2.1, Intel Corp., September 1999, which provides a complete description of the PXE protocol. PXE is a remote boot protocol that relies upon a set of industry-standard, Internet-related protocols, such as TCP/IP (Transport Control Protocol/Internet Protocol), DHCP (Dynamic Host Configuration Protocol), and TFTP (Trivial File Transfer Protocol). PXE extends DHCP by using the option fields within DHCP-formatted packets to transfer PXE-related information. By using standard protocols, an enterprise is able to use its existing TCP/IP network infrastructure with the DHCP protocol to implement remote boot capabilities.

Figure 2A:
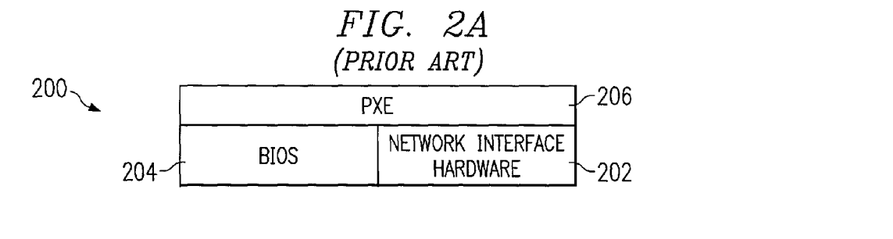
FIGS. 2A-2D are a set of figures that are used to describe the standard PXE remote boot methodology.

Referring to FIG. 2A, a block diagram describes PXE-enabled client 200. Network interface hardware 202 must be present within the client device to communicate with other devices across a network. The client also contains BIOS (Basic Input/Output System) 204, usually in the form of a ROM, that allows the client to perform the initial steps of a boot process, such as a Power On Self-Test (POST) that initializes the client hardware. Client 200 also contains PXE functionality 206, which is usually contained within another ROM. It should be noted that the present invention (described in more detail below after the description of the standard PXE protocol) does not require modification to the typical DHCP functionality within the client.

PXE specifies the protocols by which a client requests and downloads an executable image from a boot server. PXE does not specify the operational details and functionality of the network bootstrap program (NBP) that the client receives from the server, i.e. the remote boot image downloaded by the PXE client via TFTP or MTFTP (Multicast TFTP). In general, the execution of the downloaded NBP initiates a series of processing steps on the client that ultimately will result in the client being ready for use by its user. Typically, the NBP will use an application program interface (API) specified by PXE and provided by the client PXE support to request and install additional files via M/TFTP from the boot server containing executable images of an operating system, appropriate communications and other device drivers, and other system software. The NBP will then transfer client execution to the operating system which can use either PXE or its own communications support to request user-specific configuration information and application software executable images from the boot server for installation on the client.

The initial phase of the PXE client-server protocol uses a subset of the DHCP protocol messages to enable the client to discover a boot server, i.e. a server that delivers executables for booting the client. The client may use the opportunity to obtain an IP address, which is the expected behavior but is not required. A standard DHCP service provides communications-related configuration values to client computers on a network during the client boot process; the primary configuration value that the client might receive is a dynamically allocated IP address. The second phase of the protocol occurs between the client and a boot server and uses the DHCP message format as a convenient format for communication, so the second phase is otherwise unrelated to the standard DHCP services.

Hence, the PXE protocol is a combination of an extension of DHCP (through the use of several DHCP Option tags) and the definition of simple packet transactions that use the DHCP packet format and options to pass additional information between the client and the server. In this manner, the functionality of existing DHCP services is not disturbed by the operation of the PXE protocol.

In the PXE protocol, DHCP option fields are used to perform the following: (a) distinguish between DHCPDISCOVER and DHCPREQUEST packets sent by a client as part of this extended protocol from other packets that the DHCP server or boot server might receive; (b) distinguish between DHCPOFFER and DHCPACK packets sent by a DHCP or Proxy DHCP server as part of this extended protocol from other packets that the client may receive; (c) convey the client system's ID (in most cases, the client's UUID—Universally Unique Identifier) to the DHCP and boot server; (d) convey the client system's architecture type to the DHCP server and boot server; and (e) convey the boot server type from which the client is requesting a response. Based on any or all of the client network adapter type, system architecture type, and client system ID, the boot server returns to the client the file name (on the server) of an appropriate NBP executable. The client downloads the specified NBP executable into memory and then executes it. As noted above, the functionality within the downloaded NBP is not specified by the PXE protocol.

In summary, the PXE protocol operates as follows. The client initiates the protocol by broadcasting a DHCPDISCOVER containing an extension that identifies the request as coming from a client that implements the PXE protocol. Assuming that a DHCP server or a proxy DHCP server implementing this extended protocol is available, after several intermediate steps, the server sends the client a list of appropriate boot servers. The client then discovers a boot server of the type selected and receives the name of an NBP executable file on the chosen boot server. The client uses TFTP to download the NBP executable from the boot server and then initiates the execution of the downloaded NBP image.

As should be apparent from the description above, the server-side functionality of the client-server interaction must provide both standard DHCP functionality and redirection of the client to an appropriate boot server. Each PXE-enabled boot server must then have one or more executables appropriate to the clients that it serves. The redirection of the client is generally performed in two ways: (1) by implementing a combined service with standard DHCP functionality and redirection functionality; or (2) by implementing both a standard DHCP service with standard DHCP functionality and a separate redirection service with only redirection functionality. In the first case, the DHCP servers that are supplying IP addresses to clients are modified to become (or are replaced by) servers that provide IP addresses for all clients within a network while also redirecting PXE-enabled clients to boot servers as requested. In the second case, PXE redirection servers called "Proxy DHCP servers" are added to the existing network environment; these servers respond only to PXE-enabled clients and provide only redirection to boot servers. Examples of both of these methodologies are provided below.

Figure 2B:
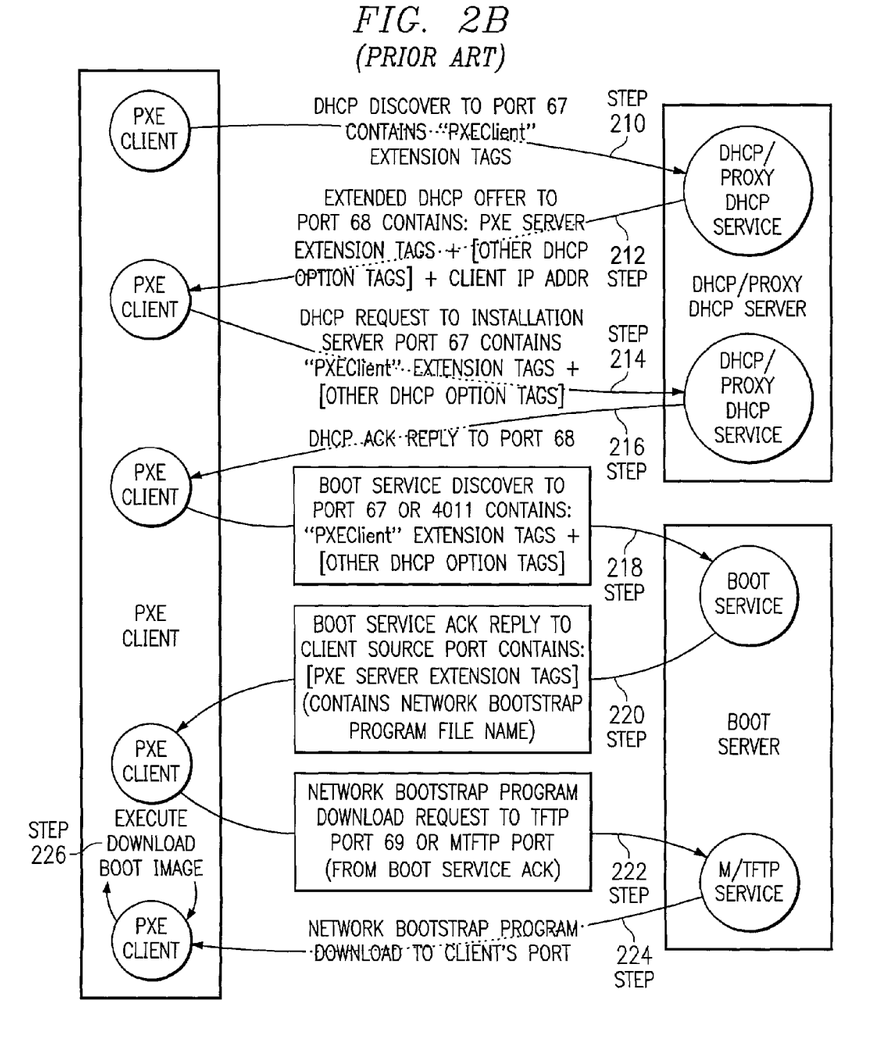

Referring to FIG. 2B, a data flow diagram shows the messages that are passed between a PXE-enabled client and a combined DHCP/Proxy DHCP server and a boot server.

The remote boot process begins with the client broadcasting a DHCPDISCOVER message to the standard DHCP port 67 (step 210). An option field in this packet contains: a tag for the client identifier (UUID); a tag for the client UNDI (Universal Network Device Interface) version; a tag for the client system architecture; a DHCP option 60, Class ID, set to "PXEClient:Arch:xxxxx:UNDI:yyyzzz".

The DHCP or Proxy DHCP service responds by sending a DHCPOFFER message to the client on the standard DHCP reply port 68 (step 212). If a Proxy DHCP service is responding, then the client IP address field is null (0.0.0.0). If a DHCP service is responding, then the returned client IP address field contains a valid IP address. It should be noted that other DHCP services could respond with DHCP offers such that the client receives multiple offers. The DHCPOFFER contains, among other data items, a client IP address and a boot server list in the Boot Server field in the PXE tags of the DHCPOFFER.

Assuming that the client selects an IP address offered by a DHCP service, it then completes the standard DHCP protocol by sending a request (DHCPREQUEST) for the selected address back to the DHCP service (step 214) and waiting for an acknowledgment (DHCPACK) from the service (step 216).

The client then selects and discovers a boot server by sending a boot service discovery message (step 218) in the appropriate manner as specified in the discovery control options included in the previous DHCPOFFER containing the PXE service extension tags (using port 67 if broadcast or port 4011 if either multicast or unicast). The boot server unicasts a DHCPACK packet back to the client on the client source port (step 220). The reply packet contains the name of the boot file that the client needs to download.

The client initiates the download of the executable NBP file using either TFTP or MTFTP (step 222); the file to be downloaded and the placement of the downloaded code within memory is dependent on the client's hardware architecture, its operating system, etc. After the boot server has provided the NBP (step 224), the client can initiate the execution of the NBP (step 226).

Figure 2C:
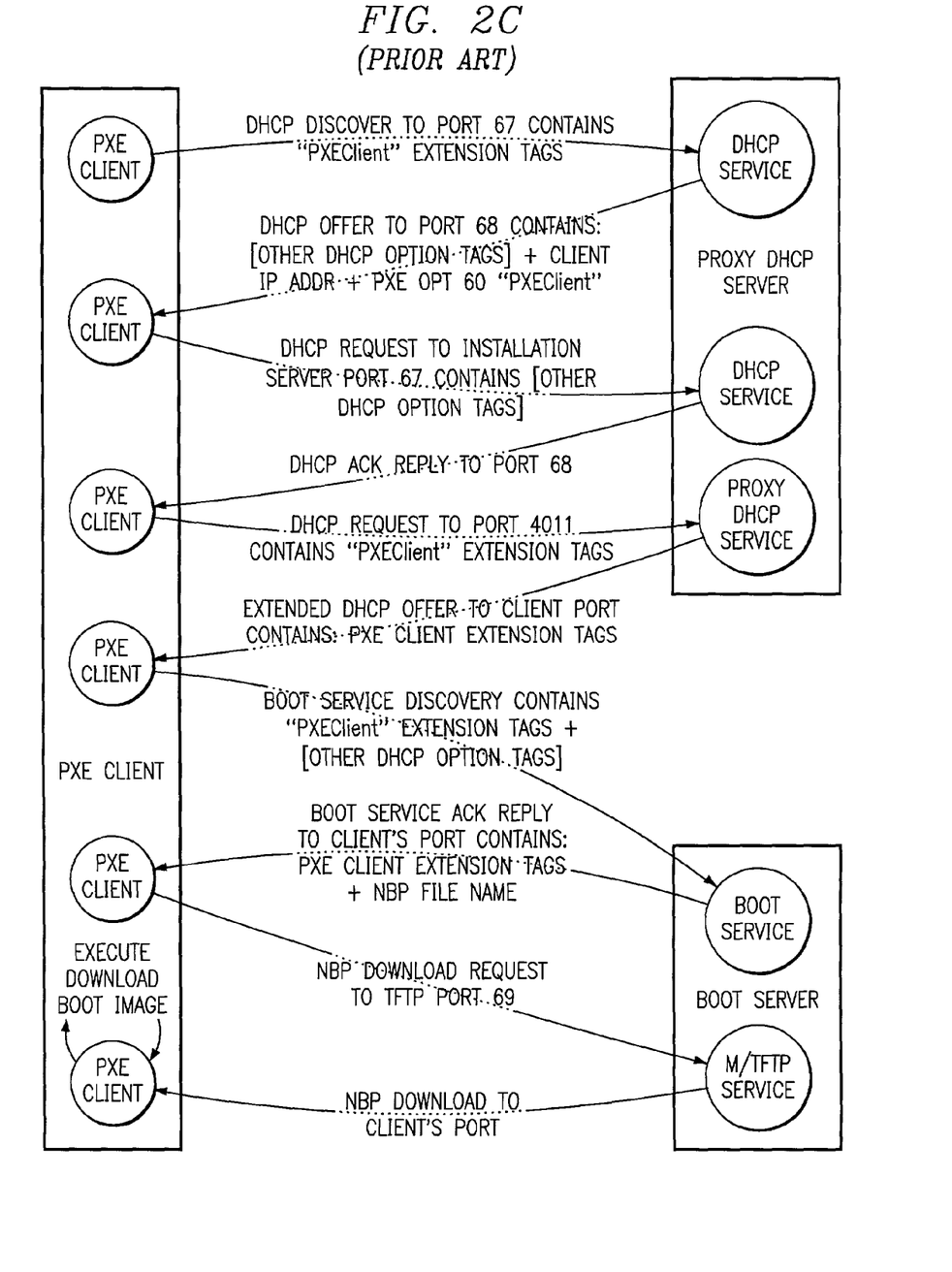

FIG. 2B depicts an implementation of the PXE protocol in which the standard DHCP service has been modified to include the Proxy DHCP service for redirecting the client to the boot server. In contrast, FIG. 2C shows an alternative implementation of the PXE protocol in which the standard DHCP service is maintained while a Proxy DHCP service is added that supplies the PXE DHCP options. The Proxy DHCP service may reside on the same server machine as the DHCP service, or it may be located on a separate server; FIG. 2C shows the Proxy DHCP service implemented on the same server as the DHCP service. In this case, the Proxy DHCP service is listening to UDP port 4011, and communication with the Proxy DHCP service occurs after completing the standard DHCP protocol. The Proxy DHCP uses port 4011 because it cannot share port 67 with the DHCP service on the same machine. The PXE client knows to interrogate the Proxy DHCP service because the DHCPOFFER from the DHCP service contains an Option #60 "PXEClient" tag without corresponding Option #43 tags or a boot file name that the client requires to complete the PXE boot process.

Figure 2D:
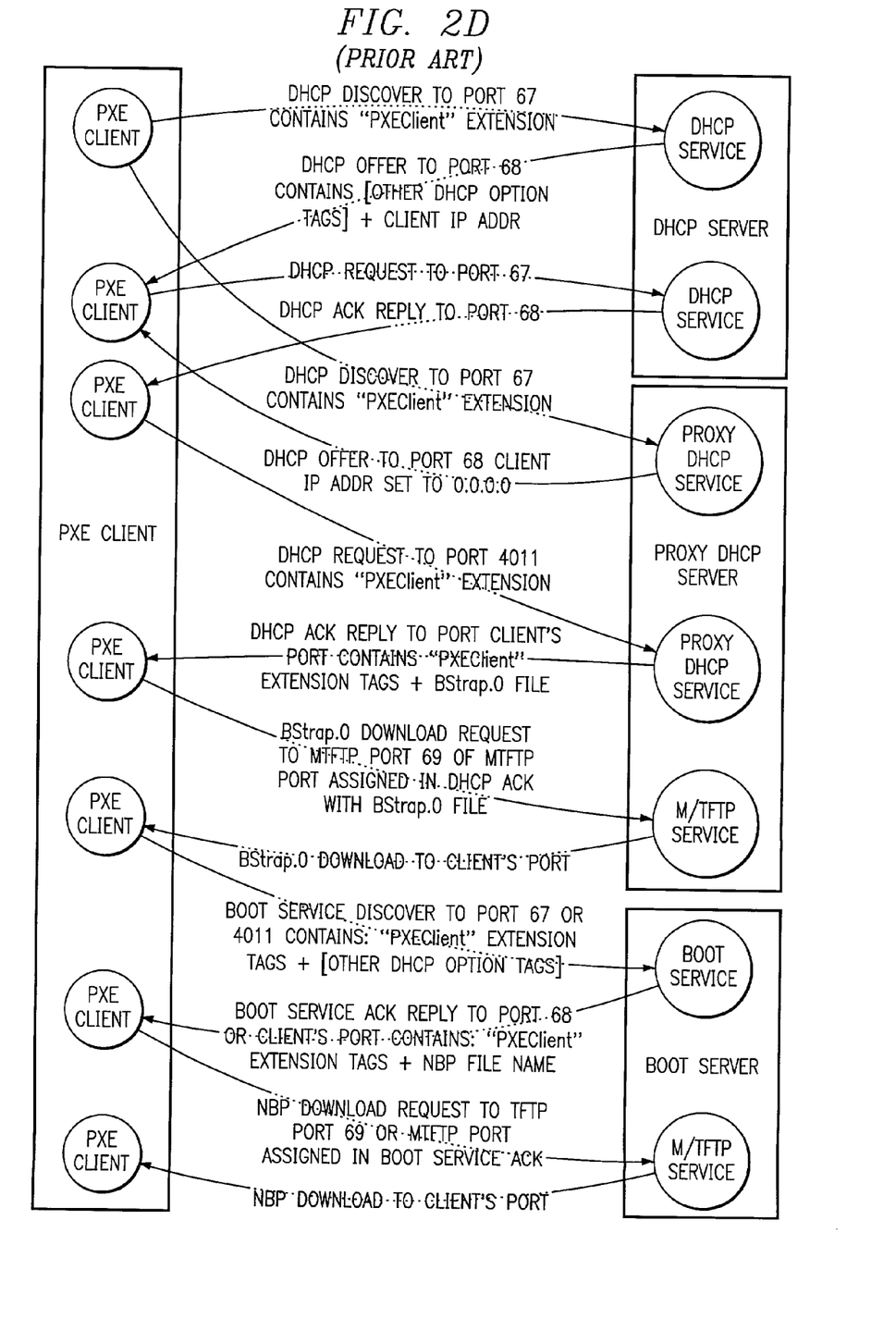

In contrast to FIG. 2B and FIG. 2C, FIG. 2D depicts an implementation of a Proxy DHCP service on a server separate from the DHCP service. In this case, since the services are implemented on different machines, the Proxy DHCP service can listen on UDP port 67 and responds in parallel with the DHCP service.

Turning to remote boot processes in general, as noted previously, a server-managed client architecture increases the reliance of clients upon the boot server for their ability to operate. By extension, the mission-critical computational tasks of the enterprise are also more reliant upon having the boot server maintain a minimum quality of service. For instance, during failure recovery after a power failure or some other type of widespread system outage, a large number of clients will need to be remote booted almost simultaneously. It would be desirable in some distributed computing environments to assure that the clients can complete the remote boot process within a specified time constraint, thereby imposing both availability and performance constraints on the remote boot infrastructure.

In order to provide this and other advantages, the present invention is directed to a load-balanced, performance-sensitive solution that ensures that the clients can complete the remote boot process with a minimum required quality of service over a wide range of operating conditions within the remote boot infrastructure. The present invention is explained below in more detail with reference to the remaining figures.

A portion of the solution provided by the present invention includes the provision of a sufficient number of alternate, i.e. redundant, boot servers in the remote boot infrastructure so that a minimum quality of service for the remote boot can be maintained for all clients over a foreseeable range of operating conditions. However, simply deploying multiple boot servers would not solve many other problems that might appear during remote boot operations. For instance, it would be advantageous for the remote boot infrastructure to assure that a client can always locate a boot server that can provide its specific software environment with at least a minimum specified quality of service. The determination of the number of alternate boot servers to accomplish the desired quality of service is not further discussed herein.

In addition, a portion of the solution provided by the present invention would assure that any boot server that can respond to a boot request from a client is able to supply that client's specific software environment. This requires an administrative process that assures that a software environment definition for a specific client is copied to all boot servers. This process does not require compliance with the remote boot processes of clients and can be implemented entirely within the administrative control of the server environment; this administrative process is not further discussed herein.

More importantly, the present invention assures that a client is directed to a boot server if and only if that boot server can adequately service the remote boot of the client with a minimum quality of service, thereby assuring that the client can select an appropriate boot server to complete the remote boot process. This portion of the solution entails compliance with the remote boot environments that are implemented as instructions in the nonvolatile memory of clients. Administrators are not likely to have control of these client remote boot environments because they are provided as hardware or firmware by vendors of network interfaces for client machines. Hence, the present invention is compatible with standard client remote boot environments, and, in particular, the relevance of a PXE-enabled network environment is explained in more detail below with respect to FIG. 3.

Figure 3:
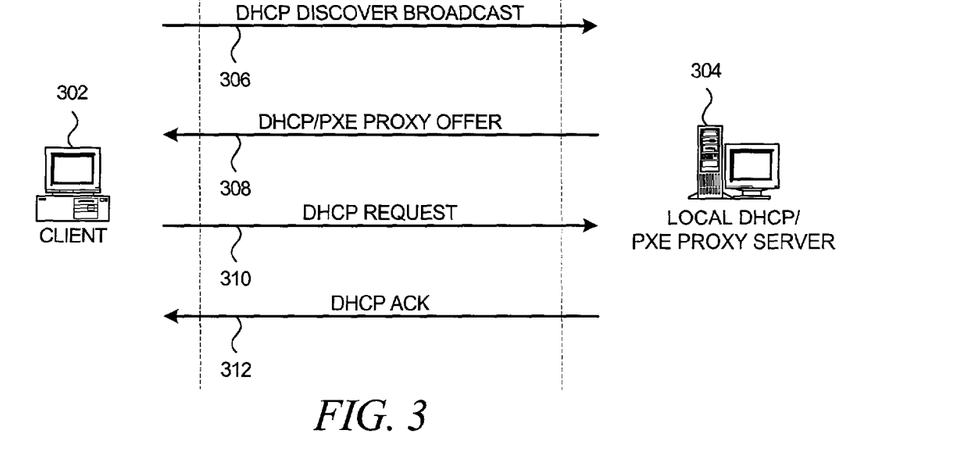
FIG. 3 is a data flow diagram that shows a series of actions between a client and a DHCP/PXE proxy server in accordance with a preferred embodiment of the present invention.

With reference now to FIG. 3, a data flow diagram shows a series of actions between a client and a DHCP/PXE proxy server in accordance with a preferred embodiment of the present invention. Client 302 has a network interface that supports the PXE specification. The PXE specification in the Intel® Wired for Management (WfM) initiative, previously discussed in more detail above, is a standard client remote boot environment that has gained wide acceptance among vendors of client network interfaces that support Internet Protocol (IP) networks. IP networks have become very common in distributed enterprise computing environments because IP is an open, rather than proprietary, protocol that is implemented on both local area networks (LANs) and wide area networks (WANs). IP is also supported by a large number of computer communications devices.

At some point in time, client 302 is powered-on or otherwise restarted in a manner that requires it to perform a remote boot operation. At this time, client 302 is executing code within its PXE ROM. PXE-enabled client 302 initiates the remote boot process by broadcasting a DHCP Discover message (step 306). This message contains a unique identifier of the client, and the packet indicates that the client needs to be assigned an IP address so that it can perform all subsequent point-to-point, network-wide communications. This packet also indicates that the client implements PXE and needs to be directed to a boot server to complete a remote boot operation. The PXE support in the client waits briefly so that it can receive one or more responses before choosing a response.

In this example, server 304 responds to the DHCP Discover message from client 302. Server 304 returns a DHCP/PXE Proxy Offer message (step 308) which offers an IP address to the client and indicates an IP address of a central boot server that provides PXE Boot Server Discovery service. The significance of the central boot server is discussed in more detail further below.

Client 302 responds with a DHCP Request message (step 310) that requests the IP address offered to client 302 by server 304, which essentially is an acceptance of the offered IP address. Server 304 then responds with a DHCP Ack message (step 312), which confirms the assignment of the IP address to client 302.

After receiving the DHCP Ack message, client 302 ceases communication with server 304 with respect to the DHCP-related operations. Client 302 may communicate with server 304 at some later point in time with respect to other services. In this example, client 302 performs the remaining remote boot operations with servers that are physically distinct from server 304.

It should be noted that the configuration of the DHCP/PXE Proxy server is not limited to an implementation on a single machine as represented in FIG. 3. The "standard" DHCP service (which offers IP addresses to clients) and the "proxy" DHCP service (which directs clients to a PXE Boot Server Discovery service) can be located on separate machines. In such a case, there will be two separate communications in place of step 308 above: a "standard" DHCP offer which offers an IP address to the client; and a "proxy" DHCP offer which directs the client to a PXE Boot Server Discovery service. In addition, the communications depicted in steps 310 and 312 above would occur between the client and the "standard" DHCP service only. In fact, any of the configurations described in Intel Corp.'s *Preboot Execution Environment (PXE) Specification, Version* 2.1, and illustrated in FIGS. 2B-2D, or any other specification of initial boot operations, could be used for this invention as long as the client can receive an IP address and by directed to a central boot server, i.e. a boot direction service.

It should also be noted that there may be more than one instance of a "standard" DHCP service, of a "proxy" DHCP service, and/or of a "combined" DHCP service, i.e. a DHCP service that does both by offering an IP address to the client and directing the client to a Boot Discovery service, within the range of the client's DHCP Discover broadcast. This can be accomplished by placing the instances of these DHCP services on machines located in the same subnetwork as the client, and/or by configuring network gateways and routers to forward the client's DHCP Discover broadcasts to DHCP services on machines located in other subnetworks. In this regard, client 302 and server 304 are similar to client 402 and server 408 described with respect to FIG. 4 below. Having more than one instance of these DHCP services can provide redundancy in case any one instance of these DHCP services becomes unable to respond to the client. If the client receives more than one "standard", "proxy" or "combined" DHCP/PXE Proxy offer, it will select only one IP address for its use, and will select only one Central Boot Server IP address to be directed to.

Figure 4:
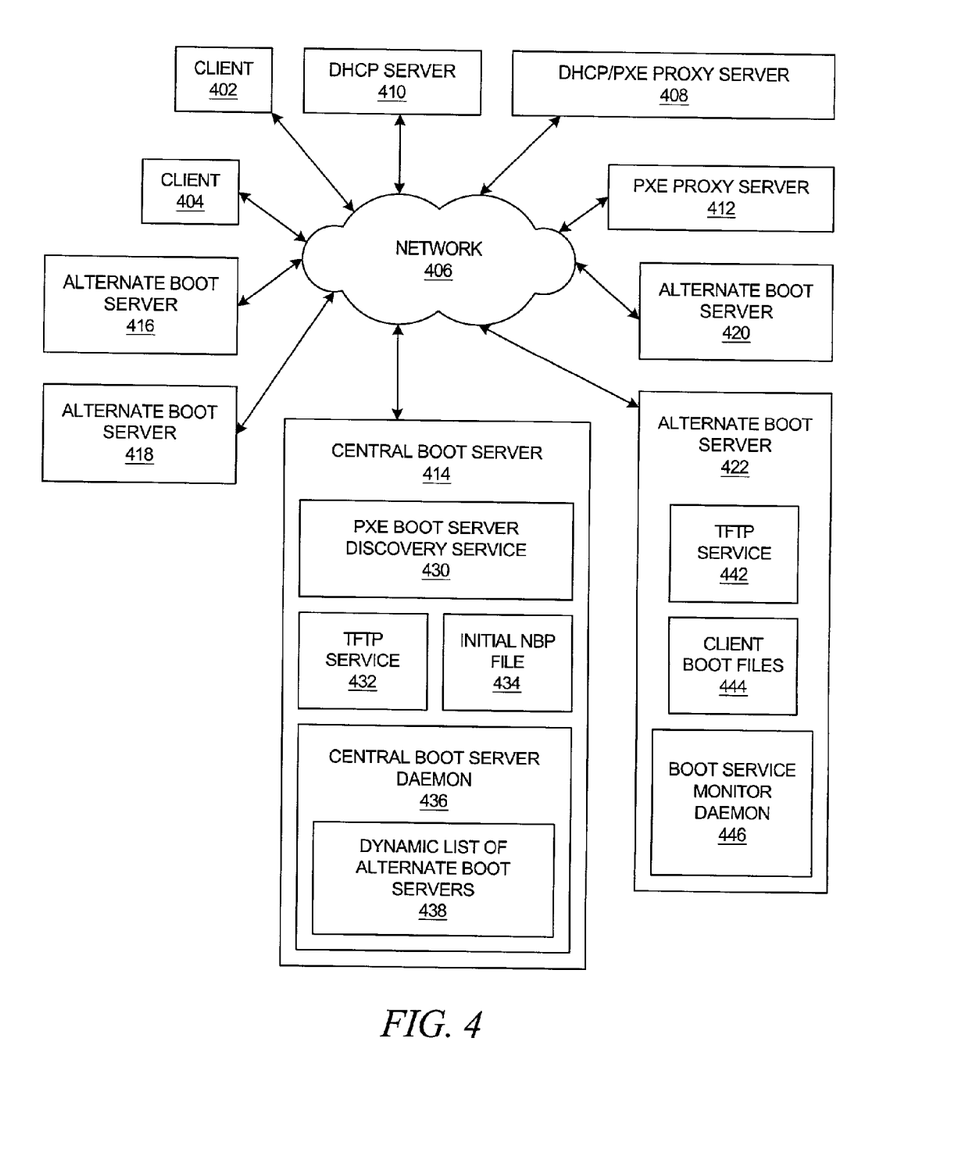
FIG. 4 is a block diagram depicting a client-server configuration for performing a remote boot operation in accordance with the present invention.

With reference now to FIG. 4, a block diagram depicts a client-server configuration for performing a remote boot operation in accordance with the present invention. Clients 402 and 404 perform remote boot operations via network 406. DHCP/PXE proxy server 408 provides a combined DHCP/PXE proxy service, while DHCP server 410 provides only DHCP services and PXE proxy server 412 provides only PXE proxy service.

As noted above, there may be more than one instance of a "standard" DHCP service, of a "proxy" DHCP service, and/or of a "combined" DHCP service within the network. In that regard, network 406 may support multiple instances of DHCP servers, multiple instances of PXE proxy servers, and multiple instances of DHCP/PXE proxy servers. In prior art implementations of the PXE protocol, an instance of a PXE proxy service may supply a list of one or more boot servers in the DHCP Offer message. In contrast, in the present invention, each instance of the PXE proxy service is configured to "redirect" the client to a central boot server. In other words, each instance of the PXE proxy service is configured to provide a boot server list in the DHCP Offer message that contains a single, central boot server.

Central boot server 414 provides PXE boot server discovery service, and alternate boot servers 416-422 provide additional services needed to boot clients. Central boot server 414 comprises PXE Boot Server Discovery service 430 for responding to Boot Service Discover messages from clients. TFTP service 432 responds to TFTP requests from clients, such as a request for initial NBP file 434. Central boot server daemon 436 maintains list 438 of IP addresses of alternate boot servers.

Each instance of alternate boot servers 416-422 comprises TFTP service 442 for responding to TFTP requests from clients, such as requests for client boot files 444, which may be operating system files, application files, configuration files, or other types of files. Boot service monitor daemon 446 performs certain types of monitoring functions on an alternate boot server. Additional details of the operations of central boot server 414 and alternate boot servers 416-422 are provided below.

Figure 5A:
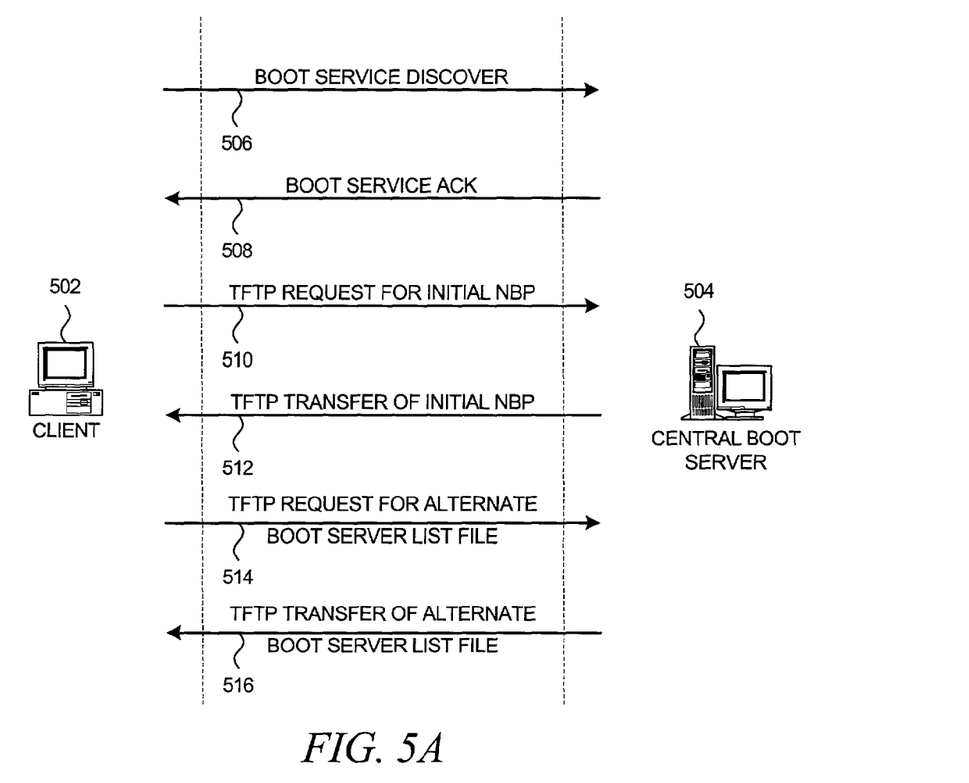
FIG. 5A is a data flow diagram showing a series of actions between a client and a central boot server in accordance with a preferred embodiment of the present invention.

With reference now to FIG. 5A, a data flow diagram shows a series of actions between a client and a central boot server in accordance with a preferred embodiment of the present invention. FIG. 5A should be interpreted as depicting a sequence of steps that occurs immediately following the sequence of steps that are depicted within FIG. 3, and client 502 in FIG. 5A is identical to client 302 in FIG. 3. In FIG. 3, client 302 was provided with an IP address of a central boot server that provides PXE Boot Server Discovery service; in FIG. 5A, central boot server 504 owns the provided IP address. Hence, client 502 communicates with central boot server 504 to continue with its remote boot operations.

Client 502 sends Boot Service Discover message to central boot server 504 (step 506), which requests the IP address of a instance of a TFTP service for requesting an initial NBP. It should be noted that, in order to provide redundancy, there may be more than a single instance of "a central boot server" that is running a PXE Boot Server Discovery service. It is possible to configure network devices, such as gateways, routers, and servers, to redirect the client-originated Boot Server Discover packets originally directed to the IP address of a "primary" central boot server machine that has failed so that a "backup" central boot server machine can receive and process them. In this manner, it is not necessary to change the configuration of the DHCP/PXE proxy servers in the event that the "primary" central boot server machine fails.

Central boot server 504 responds with a Boot Service Ack message (step 508) that indicates the IP address of central boot server 504 and also indicates the file name of the initial NBP. In other words, the PXE Boot Server Discovery service on the central boot server points the client to an instance of the TFTP service on the same central boot server.

Client 502 sends a TFTP Request message (step 510) to central boot server 504 to request the initial NBP, and central boot server 504 then responds with a TFTP transfer of the initial NBP file (step 512). After receiving the initial NBP file, the PXE ROM code within client 502 transfers execution to the initial NBP.

The initial network bootstrap program is configured to perform the following operations. Under the execution control of the initial NBP, client 502 sends a TFTP Request message (step 514) to central boot server 504 to request a file containing a list of alternate boot servers. The alternate boot server list file is a small text file with a simple syntax for listing alternate boot server addresses; the data format of the file may vary depending on the implementation of the invention. In response, central boot server 504 performs a TFTP transfer of the alternate boot server list file (step 516). The manner in which central boot server 504 generates or maintains the alternate boot server list file is described in more detail further below.

After receiving the alternate boot server list file, client 502 ceases communication with central boot server 504 with respect to its remote boot operations. Preferably, client 502 does not further communicate with central boot server 504 because it is assumed that central boot server 504 is dedicated to performing certain duties as a central boot server.

Client 502 selects an alternate boot server from the alternate boot server list. The selected alternate boot server may be similar to alternate boot server 422 shown in FIG. 4; client 502 does not communicate with the other alternate boot servers in the alternate boot server list unless the selected boot server does not respond to requests for files.

Figure 5B:
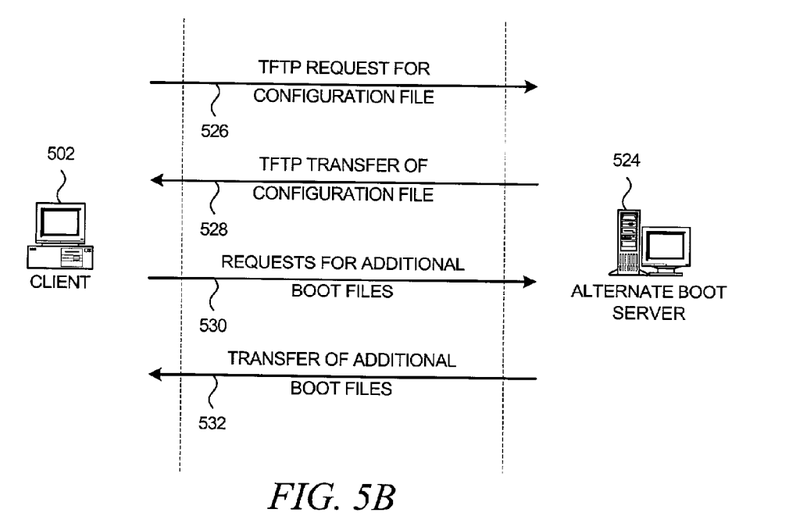
FIG. 5B is a data flow diagram showing a series of actions between a client and an alternate boot server in accordance with a preferred embodiment of the present invention.

With reference now to FIG. 5B, a data flow diagram shows a series of actions between a client and an alternate boot server in accordance with a preferred embodiment of the present invention. FIG. 5B should be interpreted as depicting a sequence of steps that occurs immediately following the sequence of steps that are depicted within FIG. 5A, and client 502 in FIG. 5B is identical to client 502 in FIG. 5A. In FIG. 5A, client 502 was provided with a list of IP addresses of alternate boot servers; in FIG. 5B, alternate boot server 524 owns the selected IP address. Hence, in FIG. 5B, client 502 is still under the execution control of the initial NBP, and client 502 communicates with alternate boot server 524 to continue with its remote boot operations.

Client 502 sends TFTP Request message to alternate boot server 524 (step 526), which requests a configuration file for client 502. In response, alternate boot server 524 performs a TFTP transfer of the requested configuration file (step 528). The configuration file comprises a list of additional files that client 502 requires to complete its remote boot operation; the configuration file may be a generic configuration file for a class of client computers, or the configuration file may be specifically configured for client 502.

Client 502 then generates additional requests for the remaining boot files using TFTP or perhaps other protocols (step 530). In response, alternate boot server 524 transfers the remaining boot files (step 532), and client 502 then continues its boot process from the transferred files stored at the client. After receiving the additional boot files, client 502 ceases communication with server 524, although client 502 may subsequently communicate with server 524 with respect to other services. In this example, it may be assumed that server 524 is dedicated to providing the boot service.

As should be apparent from the description of FIGS. 5A-5B, the present invention relies on the formation and distribution of a list of alternate boot servers to ensure that the remote boot service is load-balanced across a set of alternate boot servers. The maintenance of the list of alternate boot servers is explained in more detail below with respect to the descriptions of FIG. 6 and FIG. 7.

Figure 6:
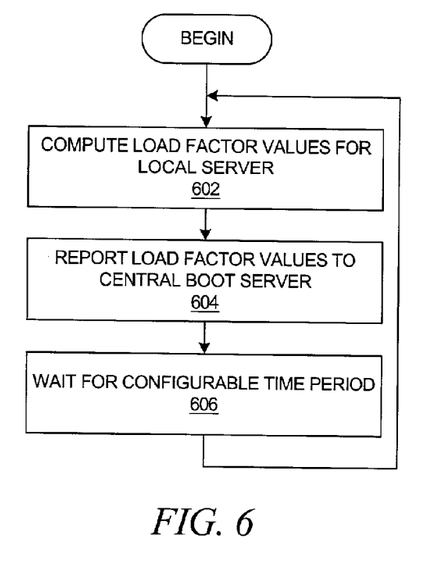
FIG. 6 is a flowchart depicting a method to be used by a boot service monitor daemon in accordance with a preferred embodiment of the present invention.

With reference now to FIG. 6, a flowchart depicts a method to be used by a boot service monitor daemon in accordance with a preferred embodiment of the present invention. Referring again to FIG. 4, alternate boot server 422 includes boot service monitor daemon 446, which executes on each alternate boot server. The operation of the boot service monitor daemon loops through a series of steps as shown in FIG. 6. Although it may be assumed that the daemon is never halted, an appropriate mechanism may be implemented for terminating the daemon if necessary.

The process starts with the boot service monitor daemon monitoring the server load using an appropriate server load algorithm to determine various load values (step 602). The boot service monitor daemon then reports the load factor values to the central boot server (step 604). The load factor values represent execution load information at the reporting alternate boot server. The form of the execution load information may vary depending upon the implementation and may be contained within a message, a data file, or any other form of a dataset. After optionally waiting for a configurable time delay interval (step 606), the boot service monitor daemon then loops through the series of steps again.

For example, the server load algorithm within the boot service monitor daemon could consider several factors within the boot server: the total number of current remote boot requests that are already being serviced by the daemon's boot server; the expected remaining duration of each remote boot request that is already being serviced; the estimated server load, e.g., in terms of CPU usage and memory utilization, to remote boot different types of client operating systems; the current trends of CPU usage and memory utilization within the boot server; and/or other factors.

Figure 7:
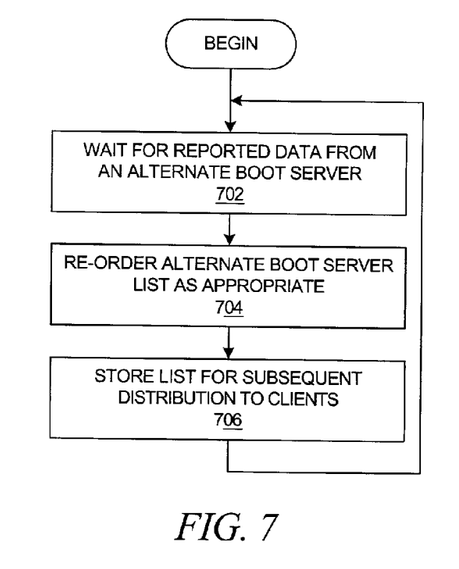
FIG. 7 is a flowchart depicting a method to be used by a boot service monitor daemon in accordance with a preferred embodiment of the present invention.

With reference now to FIG. 7, a flowchart depicts a method to be used by a boot service monitor daemon in accordance with a preferred embodiment of the present invention. Referring again to FIG. 4, central boot server 414 includes central boot server daemon 436, which executes on the central boot server. The operation of the central boot server daemon loops through a series of steps as shown in FIG. 7. Although it may be assumed that the daemon is never halted, an appropriate mechanism may be implemented for terminating the daemon if necessary.

If there is a "primary" central boot server and one or more "backup" central boot servers, then the central boot server daemon executes on the "primary" central boot server and the "backup" central boot servers. In this case, each instance of the boot service monitor daemon on the multiple alternate boot servers reports its data to multiple instances of the central boot server daemon.

The process starts with the central boot server daemon waiting to receive server load values from any one of the boot service monitor daemons that is operating on the alternate boot servers (step 702). The daemon then reorders the list of alternate boot servers as appropriate (step 704) and stores the list for subsequent distribution to clients upon request (step 706).

The central boot server dynamically maintains the list of alternate boot server addresses. The order of the alternate boot server addresses on this list is updated and re-ordered by the central boot server daemon using its own algorithm with various inputs. In addition to the load factor values reported by each alternate boot server that indicate the current status of the availability and the loading of an alternate boot server, the central boot server daemon may also have access to data provided by other services, such as an indication of the current load status of the network or various subnetworks.

Preferably, the address of the alternate boot server that can most efficiently service the next received client computer boot request appears first on the list with the other alternate boot server addresses following in order of decreasing efficiency with which they can service a client request. As mentioned above in the description of FIG. 5A, after step 516 in which the client receives the file containing the list of alternate boot server addresses, the client selects an alternate boot server address. It may be assumed that the client selects the first address on the list, but it is not necessary.

The advantages of the present invention should be apparent in view of the detailed description of the invention that is provided above. In the prior art, a typical PXE-compliant remote boot implementation has the disadvantage of being static in nature because of the configuration of the PXE support on the client and of the configurations of the DHCP server services and other remote boot support services on the boot servers. These typical configurations cannot be changed dynamically in response to changing boot server quality of service conditions. For example, it is possible for the boot services on a boot server to continue to operate and send responses that direct clients to that same boot server even though other services on the boot server that are required to complete the remote boot of clients have failed or have had their quality of service degraded below an acceptable level by severe server processing loads.

Hence, the present invention provides a method and system for a performance-sensitive remote boot solution that can dynamically respond to changes in the quality of service provided by each of multiple redundant boot servers. When a client machine makes a boot request on the network, the boot servers that have spare capacity to service the boot request will be preferentially indicated to the client. Boot servers that are relatively overloaded are concurrently de-emphasized, thereby discouraging a client from attempting to boot from a boot server from which it will receive slow service.

The present invention uses a small text file with a simple syntax for indicating a list of alternate boot server addresses that is maintained by a daemon on a central boot server. The central boot server daemon interprets boot server status information to determine the most efficient ordering of the addresses on the list. The ordering can be changed by simply rewriting or replacing the text file so that the next client remote boot request receives the new order. The central boot server needs to send only the small initial bootstrap program file and the alternate boot server list file to a client computer. The bulk of the boot files are sent by the alternate boot servers, and the significant workload of serving those files is efficiently distributed among the alternate boot servers.

With the present invention, no configuration requirements are placed on the client computers. In addition, boot direction services have a minimal initial configuration requirement whereby clients are directed to the central boot server, and the boot direction service does not need to be changed when network or boot server conditions change.

The present invention also avoids the need to physically collocate a boot server in the same subnetwork with each subset of client computers because of limitations which may be imposed by the inability to route client boot request broadcasts between subnetworks. This minimizes the need to reconfigure the network or physically move computers to meet network requirements as the population of client computers and server computers changes.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method at a server for facilitating a remote boot process at a client, wherein the client and the server reside on a network, the method comprising the steps of:
   receiving, at the server, a dataset of load information associated with an execution load at a boot server;
   in response to receiving the dataset of load information, ordering a list of multiple boot server addresses based on the received dataset of load information and based on previously received datasets of load information;
   receiving, at the server, a first file transfer request initiated by a remote boot process at the client;
   in response to receiving the first file transfer request, sending a file comprising the ordered list of multiple boot server addresses to the client.

2. The method of claim 1, further comprising, prior to the step of receiving the first file transfer request:
   receiving, at the server, a boot service discover message from the client; and
   in response to receiving the boot service discover message, sending a boot service acknowledgment message to the client.

3. The method of claim 1, further comprising, prior to the step of receiving the first file transfer request:
   receiving, at the server, a second file transfer request from the client; and
   in response to receiving the second file transfer request, sending an initial network bootstrap program to the client, wherein the initial network bootstrap program, when executed at the client, generates the first file transfer request.

4. The method of claim 1, wherein the previously received datasets of load information are received from a plurality of different boot servers.

5. The method of claim 4, wherein the server is a central server, and further comprising:
   executing a plurality of instances of the central server, wherein each instance of the plurality of instances receives the datasets of load information from each of the plurality of different boot servers.

6. The method of claim 5, wherein a central server daemon process runs on each of the plurality of instances of the central server and receives the datasets of load information from each of the different boot servers.

7. The method of claim 2, wherein the boot service acknowledgment message indicates an internet protocol (IP) address of the server and a file name of an initial boot program.

8. A method at a server for facilitating a remote boot process at a client, wherein the client and the server reside on a network, the method comprising the steps of:
   receiving, at the server, a boot file transfer request initiated by a remote boot process at the client;
   in response to receiving the boot file transfer request, sending a file to the client;
   monitoring an execution load at the server;
   generating a dataset containing load information associated with the execution load at the server; and
   sending the generated dataset to another server.

9. An apparatus for facilitating a remote boot process at a client on a network, the apparatus comprising a data processor coupled to a memory having stored therein instructions, when executed by the data processor, to perform steps of:
   receiving a dataset of load information associated with an execution load of a boot server;
   ordering, in response to receiving the dataset of load information, a list of multiple boot server addresses based on the received dataset of load information and based on previously received datasets of load information;
   receiving a first file transfer request initiated by a remote boot process at the client; and
   sending, in response to receiving the first file transfer request, a file comprising the ordered list of multiple boot server addresses to the client.

10. The apparatus of claim 9 further comprising instructions to perform steps of:
    receiving a boot service discover message from the client; and
    sending a boot service acknowledgment message to the client in response to receiving the boot service discover message.

11. The apparatus of claim 9 further comprising instructions to perform steps of:
    receiving a second file transfer request from the client; and
    sending an initial network bootstrap program to the client in response to receiving the second file transfer request, wherein the initial network bootstrap program, when executed at the client, generates the first file transfer request.

12. The apparatus of claim 9, wherein the previously received datasets of load information are received from a plurality of different boot servers, wherein the server is a central server, and further comprising instructions that are operable to perform a step of:

executing a plurality of instances of the central server, wherein each instance of the plurality of instances receives the datasets of load information from each of the plurality of different boot servers.

13. A data processing system for facilitating a remote boot process on a network, the data processing system comprising a first server comprising a first data processor coupled to a first memory, and a second server comprising a second data processor coupled to a second memory, wherein the first memory has stored therein first instructions, when executed by the first data processor, to perform steps of:

receiving, at the first server, a dataset of load information associated with an execution load of the second server;
ordering at the first server, in response to receiving the dataset of load information, a list of multiple boot server addresses based on the received dataset of load information and based on previously received datasets of load information;
receiving at the first server a first file transfer request initiated by a remote boot process at a client; and
sending, in response to receiving the first file transfer request, a file comprising the ordered list of multiple boot server addresses to the client from the first server; and wherein the second memory has stored therein second instructions, when executed by the second data processor, to perform steps of:
receiving at the second server a boot file transfer request from the client;
sending a file to the client in response to receiving the boot file transfer request;
monitoring an execution load at the second server;
generating a dataset containing load information associated with the execution load at the second server; and
sending the generated dataset to the first server.

14. The data processing system of claim 13, further comprising instructions that are operable to perform steps of:

receiving, at the first server, a boot service discover message from the client; and
in response to receiving the boot service discover message, the first server sending a boot service acknowledgment message to the client.

15. The data processing system of claim 14, wherein the boot service acknowledgment message indicates an internet protocol (IP) address of the first server and a file name of an initial boot program.

16. The data processing system of claim 13, further comprising instructions that are operable to perform steps of:

receiving, at the server, a second file transfer request from the client; and
in response to receiving the second file transfer request, sending an initial network bootstrap program to the client, wherein the initial network bootstrap program, when executed at the client, generates the first file transfer request.

17. A computer program product stored on a memory for use in a server for facilitating a remote boot process at a client, wherein the client and the server reside on a network, the computer program product comprising:

instructions to receive, at the server, a dataset of load information associated with an execution load at a boot server;
instructions to order, in response to receiving the dataset of load information, a list of multiple boot server addresses based on the received dataset of load information and based on previously received datasets of load information;
instructions to receive, at the server, a first file transfer request initiated by a remote boot process at the client;
instructions to send, in response to receiving the first file transfer request, a file comprising the ordered list of multiple boot server addresses to the client.

18. The computer program product of claim 17 further comprising:

instructions to receive, at the server, a boot service discover message from the client; and
instructions to send, in response to receiving the boot service discover message, a boot service acknowledgment message to the client.

19. The computer program product of claim 18 further comprising:

instructions to receive, at the server, a second file transfer request from the client; and
instructions to send, in response to receiving the second file transfer request, an initial network bootstrap program to the client, wherein the initial network bootstrap program, when executed at the client, generates the first file transfer request.

20. The computer program product of claim 9, wherein the previously received datasets of load information are received from a plurality of different boot servers, wherein the server is a central server, and further comprising:

instructions to execute a plurality of instances of the central server, wherein each instance of the plurality of instances receives the datasets of load information from each of the plurality of different boot servers.

* * * * *